US011218454B2

(12) United States Patent
Vyncke et al.

(10) Patent No.: US 11,218,454 B2
(45) Date of Patent: Jan. 4, 2022

(54) FACILITATING USER PRIVACY IN COMMUNICATIONS INVOLVING SEMANTIC-BEARING IPV6 ADDRESSES

(71) Applicant: Cisco Technology, Inc., San Jose, CA (US)

(72) Inventors: Eric Vyncke, Alleur (BE); Guillaume Ruty, Paris (FR); Pierre Pfister, Chalons-en-Champagne (FR); Andre Jean-Marie Surcouf, St Leu la Foret (FR)

(73) Assignee: CISCO TECHNOLOGY, INC., San Jose, CA (US)

( * ) Notice: Subject to any disclaimer, the term of this patent is extended or adjusted under 35 U.S.C. 154(b) by 297 days.

(21) Appl. No.: 16/268,087

(22) Filed: Feb. 5, 2019

(65) Prior Publication Data

US 2020/0252377 A1 Aug. 6, 2020

(51) Int. Cl.
*H04L 29/06* (2006.01)
*H04L 29/12* (2006.01)
(Continued)

(52) U.S. Cl.
CPC ...... *H04L 63/0428* (2013.01); *G06F 21/6245* (2013.01); *H04L 45/741* (2013.01);
(Continued)

(58) Field of Classification Search
CPC ... H04L 63/0428; H04L 45/74; H04L 45/741; H04L 63/164; H04L 29/12915; H04L 61/6059; G06F 21/6245
See application file for complete search history.

(56) References Cited

U.S. PATENT DOCUMENTS 7,916,739 B2 * 3/2011 Trostle ............... H04L 63/166
370/401
8,295,306 B2 * 10/2012 Bagepalli ............. H04L 69/161
370/469
(Continued)

OTHER PUBLICATIONS

T. Narten et al., "Privacy Extensions for Stateless Address Autoconfiguration in IPv6", Network Working Group, Sep. 2017, 23 pages.
(Continued)

*Primary Examiner* — Esther B. Henderson
(74) *Attorney, Agent, or Firm* — Edell Shapiro & Finnan, LLC

(57) ABSTRACT

A message is received which indicates a request for a client-specific service address for service or content provided by a service provider. In response to the request, a client-specific service address may be generated and sent to the client. The address may be used as a destination address in one or more subsequent client requests for service or content. A first portion of the address comprises an IPv6 service prefix assigned to a service network of the service provider. A second portion of the address comprises semantic information having a first portion of encrypted private information and a second portion of unencrypted service information. The encrypted private information may be generated by encrypting private information based on a cryptographic key, where the cryptographic key is derived based on a secret key associated with the service provider and an IP client prefix assigned to the client.

20 Claims, 13 Drawing Sheets

(51) Int. Cl.
    H04L 12/749    (2013.01)
    H04L 29/08     (2006.01)
    G06F 21/62     (2013.01)
    H04L 12/747    (2013.01)

(52) U.S. Cl.
    CPC ........ *H04L 45/742* (2013.01); *H04L 61/1541* (2013.01); *H04L 63/164* (2013.01); *H04L 67/2852* (2013.01); *H04L 61/6059* (2013.01)

(56) References Cited

U.S. PATENT DOCUMENTS

| | | | | |
|---|---|---|---|---|
| 8,601,262 | B2 * | 12/2013 | Tariq | H04L 61/2015 713/162 |
| 8,832,238 | B2 * | 9/2014 | Gaitonde | H04L 61/6022 709/220 |
| 2004/0240669 | A1 * | 12/2004 | Kempf | H04L 29/12009 380/277 |
| 2007/0195788 | A1 * | 8/2007 | Vasamsetti | H04W 28/24 370/395.21 |
| 2017/0264600 | A1 * | 9/2017 | Froelicher | H04L 61/6004 |
| 2018/0004933 | A1 * | 1/2018 | Nathanson | H04W 12/086 |
| 2018/0097634 | A1 * | 4/2018 | Uppal | H04L 45/7453 |

OTHER PUBLICATIONS

A. Cooper et al., "Security and Privacy Considerations for IPv6 Address Generation Mechanisms", Internet Engineering Task Force (IETF), Mar. 2016, 18 pages.

D. O'Reilly, "A Model for Storing IPv6 Stateless Address Autoconfiguration Crime Attribution Records in a Privacy Sensitive Way draft-daveor-slaac-privacy-logging-00", Internet Engineering Task Force, https://tools.ietf.org/id/draft-daveor-slaac-privacy-logging-00.html, May 28, 2018, 11 pages.

Pawel Foremski et al., "Entropy/IP: Uncovering Structure in IPv6 Addresses", ACM. ISBN 978-1-4503-4526-2/16/11, DOI: http://dx.doi.org/10.1145/2987443.2987445, IMC 2016, Nov. 14-16, 2016, 15 pages.

S. Jiang, Ed. et al., "Analysis of Semantic Embedded IPv6 Address Schemas draft-jiang-v6ops-semantic-prefix-04", Network Working Group, Jul. 15, 2013, 22 pages.

Johanna Ullrich et al., "Privacy is Not an Option: Attacking the IPv6 Privacy Extension", Dec. 12, 2015, 21 pages.

* cited by examiner

MANIFEST FILE
1300

| 1302 | | 1304 |
|---|---|---|
| URI 1a | — | CLIENT-SPECIFIC SERVICE ADDRESS 1a |
| URI 1b | — | CLIENT-SPECIFIC SERVICE ADDRESS 1b |
| URI 1c | — | CLIENT-SPECIFIC SERVICE ADDRESS 1c |
| URI 1d | — | CLIENT-SPECIFIC SERVICE ADDRESS 1d |
| URI 2a | — | CLIENT-SPECIFIC SERVICE ADDRESS 2a |
| URI 2b | — | CLIENT-SPECIFIC SERVICE ADDRESS 2b |
| URI 2c | — | CLIENT-SPECIFIC SERVICE ADDRESS 2c |
| URI 2d | — | CLIENT-SPECIFIC SERVICE ADDRESS 2d |

FIG.13

FACILITATING USER PRIVACY IN COMMUNICATIONS INVOLVING SEMANTIC-BEARING IPV6 ADDRESSES

TECHNICAL FIELD

The present disclosure relates generally to communications between clients and servers for accessing services or content provided by a service provider, and more particularly to those same communications involving semantic-bearing Internet Protocol version 6 (IPv6) addresses.

BACKGROUND

Internet Protocol version 6 (IPv6) has greatly increased the number of available Internet Protocol (IP) addresses, enabling IP addresses to be utilized in a different way. IPv6 addresses contain 128 bits, and the number of unique IPv6 addresses is therefore significantly greater than for 32-bit IPv4 addresses. This means that content, in addition to nodes, may be associated with an IP address; in fact, each data item, whether it be a page, article or piece of multimedia content, may have its own IP address. Consequently, rather than traffic being addressed to a specific node, traffic may alternatively or additionally be addressed to a particular piece of content.

BRIEF DESCRIPTION OF THE DRAWINGS

So that the present disclosure can be understood by those of ordinary skill in the art, a more detailed description may be had by reference to aspects of some illustrative implementations, some of which are shown in the accompanying drawings.

FIG. 13 is an illustrative representation of a manifest file for use in media content delivery according to some implementations;

DESCRIPTION OF EXAMPLE EMBODIMENTS

Figure 1A:
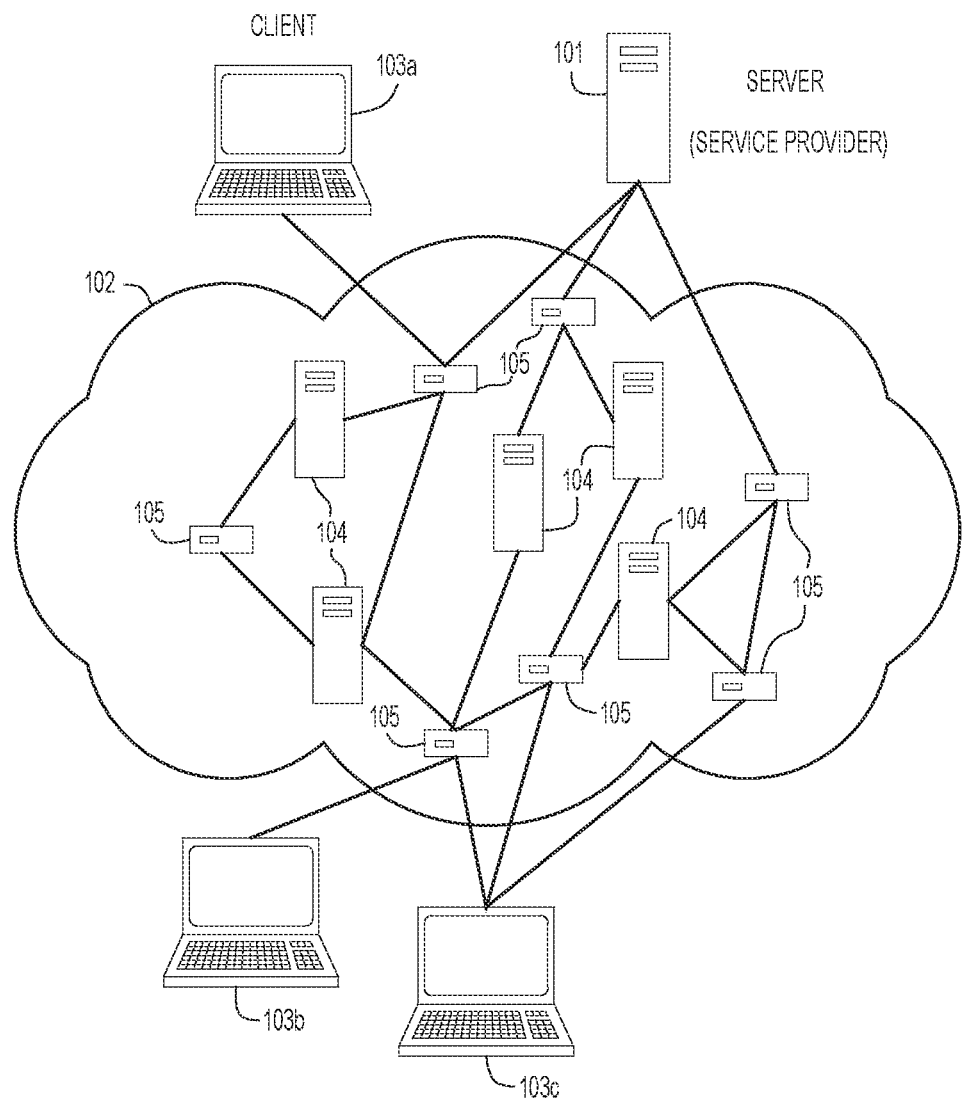
FIG. 1A is an illustrative representation of a communication network involving communications between clients and servers (e.g. and associated caches)

Numerous details are described in order to provide a thorough understanding of the example implementations shown in the drawings. However, the drawings merely show some example aspects of the present disclosure and are therefore not to be considered limiting. Those of ordinary skill in the art will appreciate that other effective aspects and/or variants do not include all of the specific details described herein. Moreover, well-known systems, methods, components, devices and circuits have not been described in exhaustive detail so as not to obscure more pertinent aspects of the example implementations described herein.

Overview

Techniques are presented herein for facilitating user privacy in communications involving semantic-bearing Internet Protocol (IP) version 6 (IPv6) addresses.

In one illustrative example of the present disclosure, a message is received which indicates a request for a client-specific service address for a service or content which is provided by a service provider. A client-specific service address may be generated and sent to the client in response to the request. A first portion of the address may comprise an IPv6 service prefix assigned to a service network of the service provider. A second portion of the address may comprise semantic information having a first portion of encrypted private information and a second portion of unencrypted service information. The encrypted private information may be generated by encrypting private information based on a cryptographic key, where the cryptographic key is derived based on a secret key associated with the service provider and an IP client prefix assigned to the client.

Upon receipt by the client, the client-specific service address may be used as a destination address in one or more subsequent client requests for the service or content. (Only) authorized nodes that are provisioned with the secret key may decrypt the encrypted private information. Server or network-side responses to the client may also use the client-specific service address as a source address, so that the interaction remains transparent to parties outside of the service provider domain. Thus, user privacy may be maintained using semantic-bearing IPv6 addresses.

In another illustrative example, a message comprising a data packet may be received at a network node (e.g. a router, switch, or server). In some implementations, the message may originate from a client and indicate a request for service or content. The message may include a source address and a destination address. The source address may include an IP client prefix assigned to a client. The destination address may have at least a first portion and a second portion. The first portion of the destination address may comprise an IPv6 service prefix assigned to a service network of a service provider. The second portion of the destination address may comprise semantic information having a first portion of encrypted private information and a second portion of unencrypted service information. The encrypted private information of the destination address may be decrypted based on a cryptographic key, where the cryptographic key is derived based on a secret key associated with the service provider and the IP client prefix assigned to the client. The data packet may be processed or forwarded to a destination server or cache based at least in part on private information.

In yet another illustrative example, a message which indicates a request for service or content may be received. In response to receiving the request, a manifest file may be generated and sent to the client. The manifest file may include a list of uniform resource indicators (URIs) for the client to access content. Each URI of one or more URIs of the manifest file include or correspond to a client-specific service address for accessing content. The client-specific service address may have at least a first portion and a second portion. The first portion of the client-specific service address may comprise an IPv6 service prefix assigned to a service network for providing the content. The second portion of the client-specific service address may comprise semantic information having a first portion of encrypted private information and a second portion of unencrypted service information. The encrypted private information may be generated by encrypting private information based on a cryptographic key, where the cryptographic key is derived from a secret key assigned to the service network or provider and an IP client prefix assigned to the client. The client-specific service address may be for use as a destination address in one or more subsequent client requests for content.

More detailed and alternative techniques and implementations are provided herein as described below.

Example Embodiments

With recent addressing schemes, private information can potentially be placed in message addresses, when previously, the private information was placed only in messages payloads which could be encrypted. Some non-private information can also be put in message addresses for the network to enforce Quality of Service (QoS) or Service Level Agreements (SLAs), or even to gather analytics.

Techniques of the present disclosure may involve a stateless method to encrypt the private part of the information contained in message addresses in a way that better guarantees that different clients use different server addresses (e.g. for content), so that a third-party "sniffer" cannot make inferences from the information in the message address.

To better explain, communication networks, such as local area networks (LANs) and wide area networks (WANs), may be implemented between nodes or network devices. The network forming the Internet (one example of a WAN) is made up of a large number of interconnected nodes. These nodes include clients, switches, servers, routers and other such devices, which may communicate using many different protocols at different layers of the Open Systems Interconnection (OSI) model.

In particular, the nodes may communicate using Internet Protocol (IP) version 4 (IPv4) communications protocol. Here, nodes in the network may be addressed using static or dynamic IPv4 addresses, some of which are globally-reachable, but many of which are specific to a local network segment.

Networks are often utilized for distributing data for storage within a network device and for later retrieval of that data. Nodes of the network may request data from one another. The nodes may do this in basically one of two different ways; they can either address a request to another node, where the request includes details of the data being requested, or they can address a request directly to the required data. The latter way is made possible thanks to IP version 6 (IPv6), but it does not work with IPv4.

IPv6 has greatly increased the number of available IP addresses, enabling IP addresses to be utilized in a different way. In particular, IPv6 has enabled the formation of semantic-bearing IPv6 addresses. Semantic-bearing IPv6 addresses may be characterized as addresses that have per-flow metadata encoded directly within the addresses themselves. Advantageously, these addresses expose application-level information to Layer-3 devices, allowing for very efficient (e.g. without deep packet inspection) and flexible (e.g. application agnostic) enforcement of network functions based on application layer criteria. For example, specific QoS, security, service chaining, or telemetry policies may be applied to applications and/or flows based solely on the metadata that is embedded in the IPv6 addresses.

In some cases, the semantics may include personal information that may be used to extract usage information. Semantics may include, for example, a content identifier (ID) (identifying a specific content, such as a music, movie, file, etc.), a type of user agent (such as a smartphone, laptop, etc.), or other. There are other scenarios where the semantic-bearing IPv6 addresses are used to identify and classify stored objects (a storage pool, tenant ID, object type, or any user-defined metadata encoding, etc.).

With the trend of using one IPv6 address per container or microservice, it is expected that there will be more semantic-bearing IPv6 addresses use-cases.

All is well when a service is run inside a single management domain. When the service is run over-the-top, however, a third party may be able to "sniff" the traffic and, even when the traffic is encrypted (e.g. using Transport Layer Security or "TLS"), may see the semantic-bearing IPv6 addresses and derive some personal information (e.g. content accessed) from the them.

FIG. 1A is an illustrative representation of an example communication network 102 involving communications between clients and servers (e.g. and associated caches). More specifically, network 100 of FIG. 1A is shown to include clients 103a, 103b, and 103c; a main server 101; caches 104; and routers 105. Note that identical numbering has been used for features which are functionally equivalent to one another, e.g. all the caches 104, and all routers 105. Each router 105 may be arranged to generally operate in the same way as each other router, all being interoperable with each other, but specific functioning and capabilities may vary between routers. Similarly, each cache may generally have the same functionality as each other cache, although the exact content stored on each and the technical capabilities of each may vary.

Figure 1B:
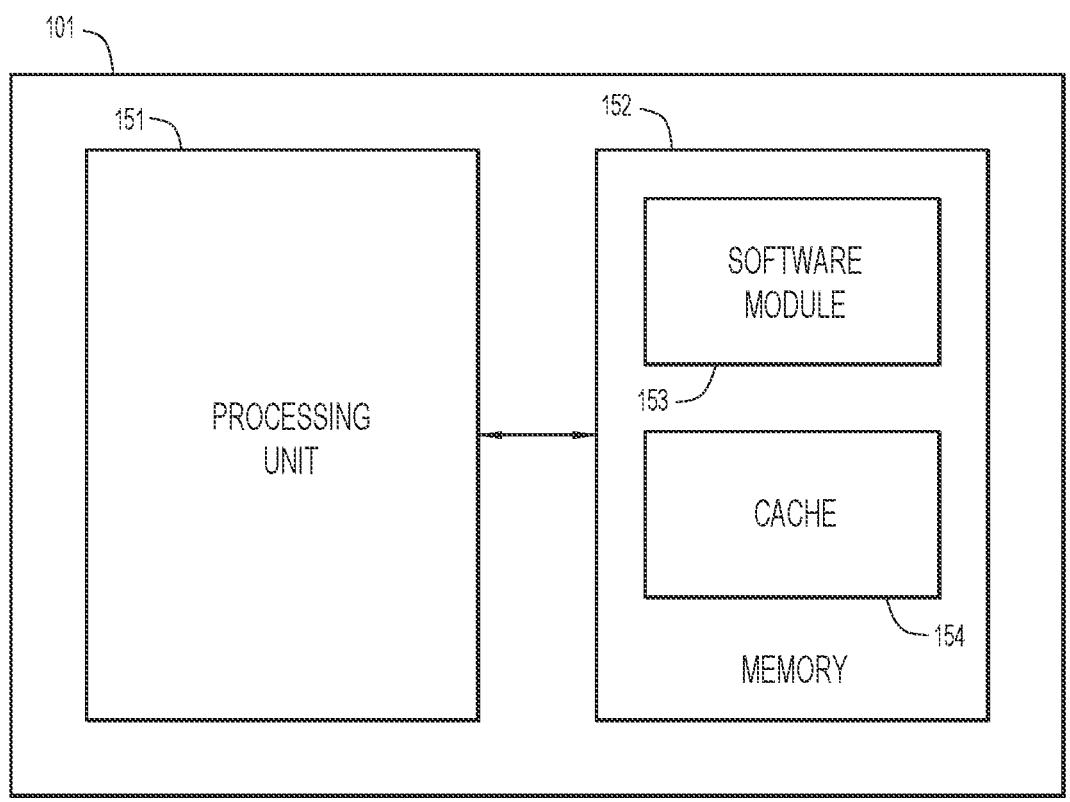
FIG. 1B is a block diagram of a server in the communication network of FIG. 1A.

FIG. 1B shows an example block diagram of the server 101 of FIG. 1A. The server 101 may include a processing unit 151 and memory 152 which may store a software module 153 for executing instructions for operation. Memory 152 may include a cache memory 154. Cache memory 154 may be used to store content that may be accessed, including access by other nodes on the network. This memory may be assigned with use of different known procedures and, most commonly, a procedure in which content most-recently requested by endpoint nodes may be stored. Indeed, FIG. 1A illustrates such endpoint nodes, which may receive data from a number of servers. If an endpoint node requests content, the server may check its cache memory to identify whether it has the content stored; if it does not, it will redirect the request to another node. For example, it may redirect the request to a central node that is the provider of the content.

In particular, FIG. 1A shows clients 103a, 103b, and 103c and illustrates one environment in which they may receive data over a communication network 102, which may be the Internet, for example. A request from a client 103 is forwarded to a cache 104, based on known routing policies. If the cache 104 does not have the exact content requested, it may either redirect the request to another node, for example it may redirect the request to a main server 101 that is the provider of the content.

Typically, routing is performed using IP addresses. The IP version currently in use is IPv4, which uses 32 bits to provide a unique address to every node on a network. This provides a little over 4 billion addresses, and it has been recognized for some time that the rate of growth of the Internet is quickly rendering this number inadequate. To solve this problem, a new version of the Internet Protocol has been developed. This new version, IPv6, uses 128-bit addresses, allowing a total of around $3.4 \times 10^{38}$ addresses.

IPv6 networks provide auto-configuration capabilities, enabling automatic assignment of an IP address to a device for example based on the device's Media Access Control (MAC) address. IPv6 networks are simpler, flatter, and more manageable, especially for large installations. Direct addressing of nodes from anywhere in the network is possible due to the vast IPv6 address space, which enable the use of globally-unique addresses, and the need for network address translation (NAT) devices is effectively eliminated.

An IPv6 address may have two parts, for example, a 64-bit prefix that is used for routing and a 64-bit interface identifier. The interface identifier was originally designed to identify a host's network interface, for example by using a hardware address such as the MAC address of the interface. It has been appreciated, however, that the interface identifier does not have to be used for this purpose. For example, the interface identifier portion may be used to identify content instead. Therefore, in some implementations, content may be associated with its own IP address. Thus, rather than routing traffic to a particular node in the network, traffic may be routed to specific content. Here, large data files, such as streams of media content, are often divided into chunks or segments of data and, in this case, each chunk may have its own address.

Figure 2:
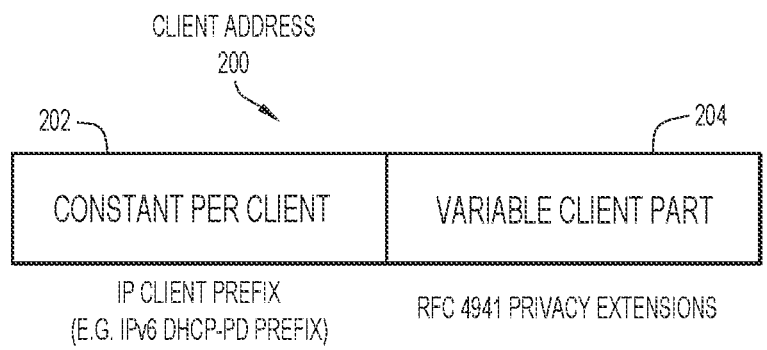
FIG. 2 is an illustration of an example message format of a client address which may be assigned to a client.

To further illustrate, FIG. 2 is an example message format of a client address 200 which may be assigned to a client. The client address 200 may have a first portion 202 which is constant per client and a second portion 204 which is variable per client. The first portion 202 of the client address 200 may be an IP client prefix assigned to the client; this IP client prefix may be, for example, an IPv6 Dynamic Host Configuration Protocol—Prefix Delegation (DHCP-PD) prefix (i.e. an IPv6 DHCP-PD prefix). The second portion 204 of the client address 200 may be one or more variable privacy extensions, such as one or more privacy extensions for stateless address autoconfiguration in IPv6, for example, according to Request For Comments (RFC) 4941.

Figure 3:
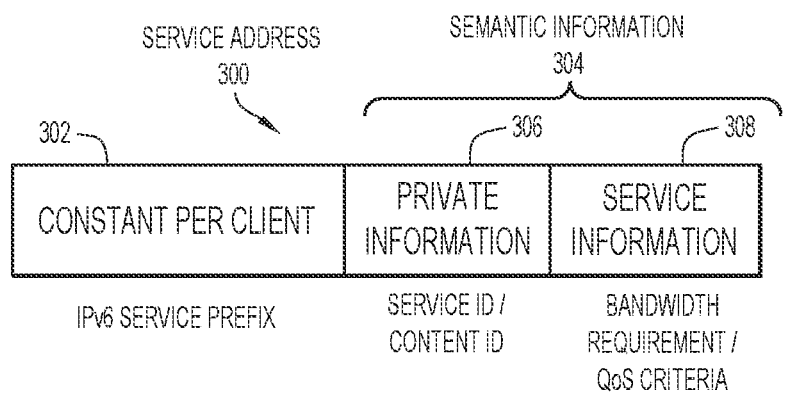
FIG. 3 is an illustration of an example message format of a service address which may be considered a semantic-bearing IPv6 address.

Today, semantic-bearing IPv6 addresses may also be used for access to a service or content provided by a service provider. FIG. 3 is an example message format of a service address 300 which may be considered a semantic-bearing IPv6 address. A first portion 302 of the service address 300 may comprise an IPv6 service prefix assigned to a service network of the service provider. A second portion 304 of the service address 300 may comprise semantic information having a first portion 306 of private information and a second portion 308 of service information.

The first portion 306 of the semantic information which corresponds to the private information may be or considered to be private in nature, such as personally identifiable information (PII) or sensitive personal information (SPI). The private information may be or include a service identifier, a content identifier, a user identifier, and a tenant identifier, as some examples. Such private information may be used by a network node to appropriately process or forward data packets to or toward the appropriate destination server or cache. The second portion 308 of the semantic information which corresponds to the service information may be used by a network node to appropriately process the data packet. This service information may be or considered to be non-private or non-sensitive information. The service information may be or include bandwidth or Quality of Service (QoS) criteria.

Figure 4:
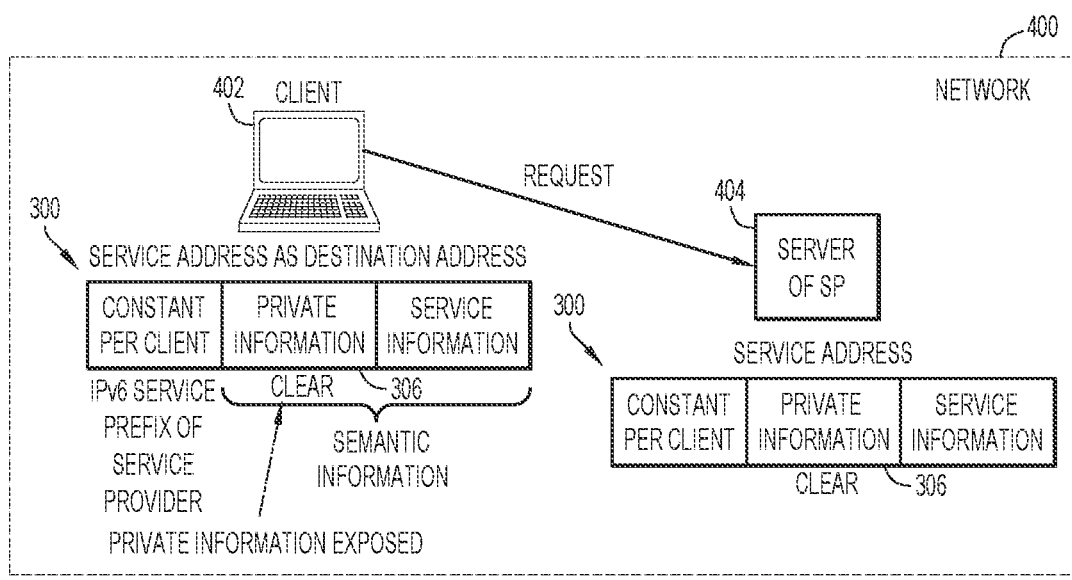
FIG. 4 is an illustrative representation of a communication network having a client and a server of a service provider, where the client may use the semantic-bearing IPv6 address of FIG. 3.

FIG. 4 is an illustrative representation of a network 400 having a client 402 and a server 404 of a service provider. Network 400 is shown in simplified form for illustrative clarity. Communication between client 402 and server 404 may involve the use of the one or more service addresses associated with the service provider; these service addresses may be semantic-bearing IPv6 addresses (e.g. the service address 300 of FIG. 3). Here, client 402 may send a message comprising a data packet to or toward server 404, where the service address 300 is used as a destination address of the message. The data packet may be appropriately processed and forwarded in accordance with the IPv6 service prefix and the semantic information.

Note, however, the private information of the semantic information is exposed. This is true even if the message is sent in a secured fashion (e.g. using Hypertext Transfer Protocol Secure or "HTTPS").

What are needed are mechanisms to facilitate user privacy in communications between clients and servers which involve the use of semantic-bearing IPv6 addresses.

Figure 5:
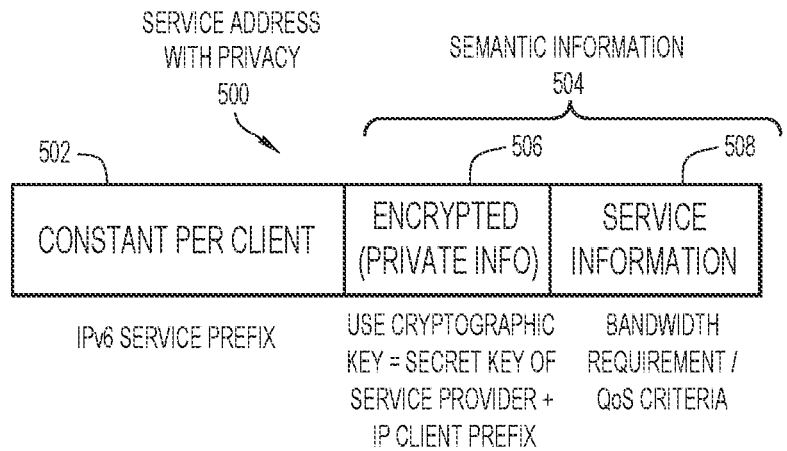
FIG. 5 is an example message format of a service address "with privacy" which is a semantic-bearing IPv6 address according to some implementations of the present disclosure.

FIG. 5 is an example message format of a service address "with privacy" 500 which may be considered to be a semantic-bearing IPv6 address according to some implementations of the present disclosure. The service address "with privacy" 500 may also be considered to be a client-specific service address.

In FIG. 5, a first portion 502 of the service address 500 may comprise an IPv6 service prefix assigned to a service network of the service provider. A second portion 504 of the service address 500 may comprise semantic information having a first portion 506 of encrypted private information and a second portion 508 of unencrypted service information.

The encrypted private information of the first portion 506 of semantics information may be generated by obtaining private information and encrypting the private information based on a cryptographic key. The cryptographic key may be derived based on a secret key associated with the service provider and an IP client prefix assigned to the client. In some implementations, the cryptographic key may be derived or generated by concatenating the secret key associated with the service provider and the IP client prefix assigned to the client. Thus, the cryptographic key may be a concatenation of the secret key associated with the service provider and the IP client prefix assigned to the client.

When encrypted, the private information is accessible and useful (only) to authorized network nodes (e.g. those network nodes that are provisioned with the secret key associated with the service provider) which may decrypt the information. Again, the private information may be or considered to be private in nature, such as PII or SPI. The private information may be or include a service identifier, a content identifier, a user identifier, and a tenant identifier, as some examples. An authorized network node may use such information order to appropriately process or forward data packets to or toward the appropriate destination server or cache. Authorized network nodes may include selected routers or switches (whether within or outside of the service network of the service provider), as well as destination servers or caches in the service network of the service provider, to name a few.

Notably, encrypted private information remains hidden and not useful to unauthorized nodes, which may nonetheless still appropriately process or forward the data packets without use of the private information. The unencrypted service information which is kept "in the clear" (e.g. the bandwidth or QoS criteria which is non-private or non-sensitive information) of the second portion 508 of semantics information may still be used by a network node (e.g. whether authorized or unauthorized) to appropriately process the data packet.

Figure 6:
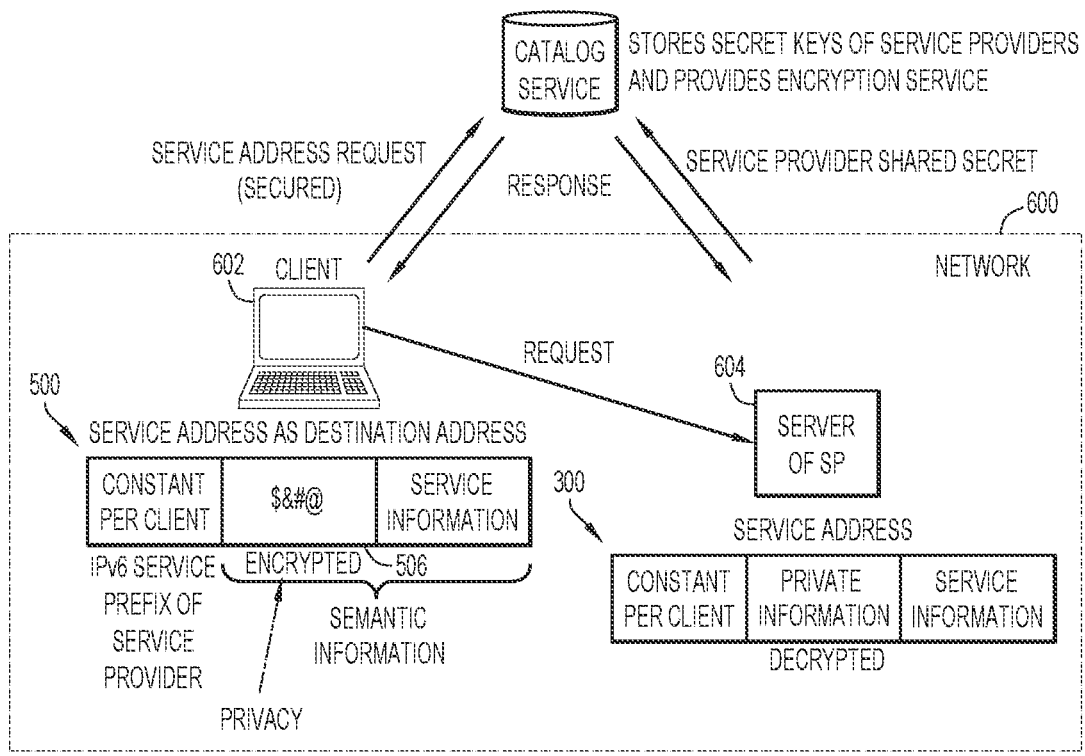
FIG. 6 is an illustrative representation of a communication network having a client and a server of a service provider, where the client may use the semantic-bearing IPv6 address of FIG. 5 according to some implementations of the present disclosure.

FIG. 6 is an illustrative representation of a network 600 having a client 602 and a server 604 of a service provider. Network 600 is shown in simplified form for illustrative clarity. Communication between client 602 and server 604 may involve the use of the one or more service addresses associated with the service provider; these service addresses may be semantic-bearing IPv6 addresses "with privacy" (e.g. the service address 500 of FIG. 5). Here, client 502 may send a message comprising a data packet to or toward server 604, where the service address 500 is used as a destination address of the message. The data packet may be appropriately processed and forwarded in accordance with the IPv6 service prefix and the semantic information. The private information of the semantic information is encrypted and, therefore, user privacy is facilitated.

Server 604 is an authorized network node that is provisioned with the secret key associated with the service provider. Therefore, the private information is accessible and useful to server 604 which may appropriate process the data packet from the client based at least in part on the private information (a service identifier, a content identifier, a user identifier, and a tenant identifier, as some examples). Other authorized network nodes may include selected routers or switches or caches (whether within or outside of the physical service network of the service provider). However, the encrypted private information remains hidden and not useful to unauthorized nodes (e.g. authorized routers or switches in the network), which may still appropriately process or forward data packets without use of any private information.

Client 602 may obtain such a client-specific service address "with privacy" with use of a catalog service node of a service catalog shown in FIG. 6. Catalog service node 604 may maintain access to (e.g. a database having) stored associations between identifiers of service providers and their (shared) secret keys. Catalog service node 604 may operate to provide an encryption service to clients. Here, catalog service node 604 may generate a client-specific service address in response to receipt of a message which indicates a request for such a client-specific service address. In some implementations, such a request message may be sent from client 602 to catalog service node 604 in a secured fashion (e.g. using Hypertext Transfer Protocol Secure or "HTTPS"). As is apparent, client 602 may obtain a client-specific service address which includes the encrypted private information without having any knowledge of or access to the secret key.

Figure 7:
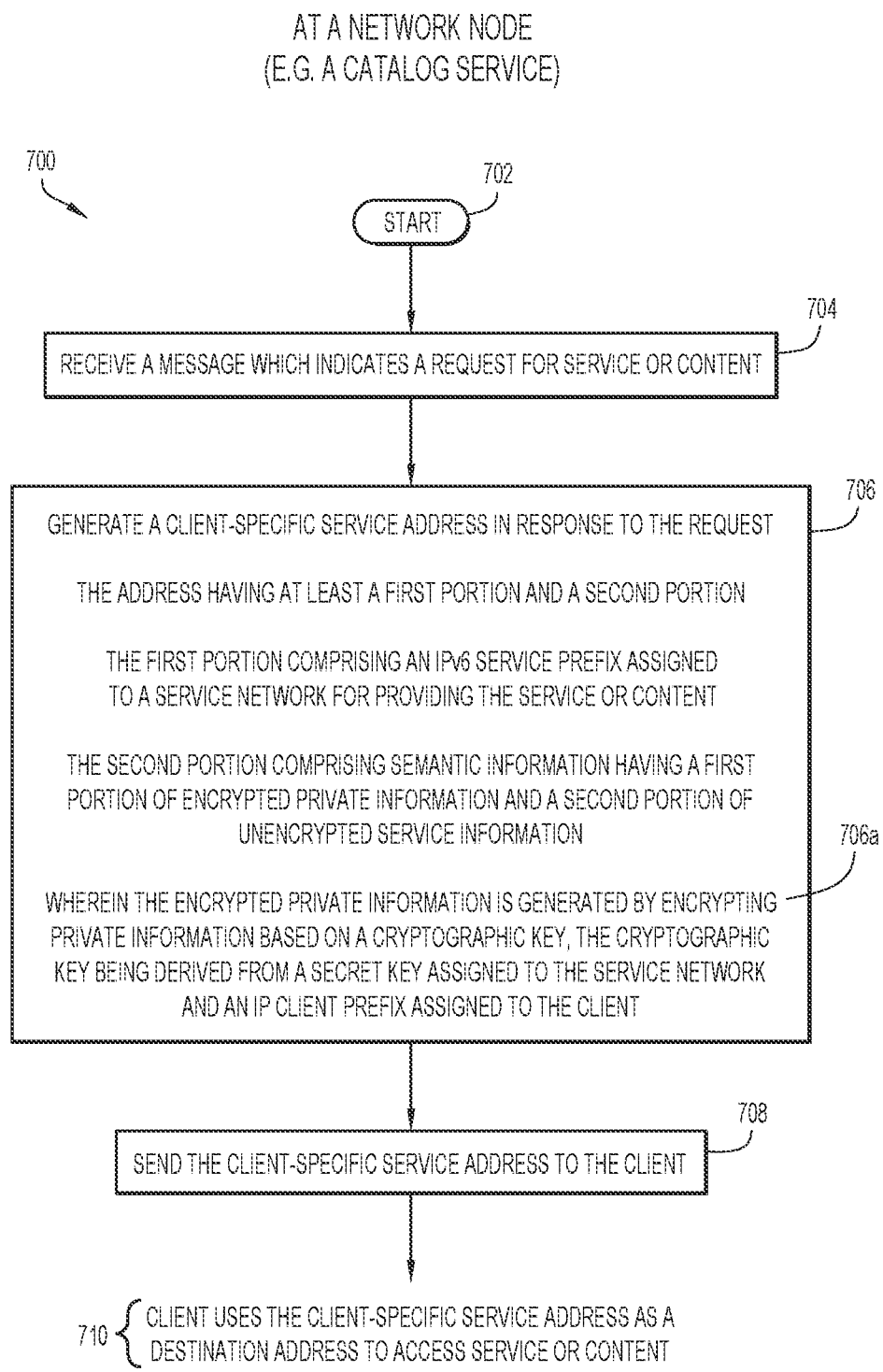
FIG. 7 is a flowchart for describing a method for use in facilitating user privacy in communications involving semantic-bearing IPv6 addresses according to some implementations of the present disclosure.

FIG. 7 is a flowchart 700 for describing a method for use in facilitating user privacy in communications involving semantic-bearing IPv6 addresses according to some implementations of the present disclosure. The method may be performed by a network node, such as a service or catalog service node. The network node may maintain access to (e.g. a database having) stored associations between identifiers of service providers and their (shared) secret keys. More generally, the network node may include one or more processors, one or more memories coupled to the one or more processors, and one or more network/communication interfaces or ports. The method may be embodied as a computer program product including a non-transitory computer readable medium and instructions stored in the computer readable medium, where the instructions are executable on one or more processors of the network node for performing the steps of the method.

Beginning at a start block 702 of FIG. 7, a message may be received which indicates a request for a client-specific service address for a service or content provided by a service provider (step 704 of FIG. 7). In response to the request, a client-specific service address may be generated and sent to the client (steps 706 and 708 of FIG. 7). The client-specific service address which is generated may have a first portion and a second portion. The first portion of the address may comprise an IPv6 service prefix assigned to a service network of the service provider. The second portion of the address may comprise semantic information having a first portion of encrypted private information and a second portion of unencrypted service information.

The encrypted private information may be generated by obtaining private information and encrypting the private information based on a cryptographic key (step 706a of FIG. 7). The cryptographic key may be derived based on a secret key associated with the service provider and an IP client prefix assigned to the client. In some implementations, the cryptographic key may be derived or generated by concatenating the secret key associated with the service provider and the IP client prefix assigned to the client. Thus, the cryptographic key may be a concatenation of the secret key associated with the service provider and the IP client prefix assigned to the client. The secret key associated with the service provider may be obtained based on accessing (e.g. a database having) stored associations between identifiers of service providers and their (shared) secret keys. The IP client prefix may be obtained from the source address of the initial message indicating the request.

Upon receipt by the client, the client-specific service address may be for use as a destination address in one or more subsequent client requests for the service or content (indication 710 of FIG. 7). Further, server or network-side responses to the client may use the client-specific service address as a source address, so that the interaction remains transparent to parties outside of the service provider domain.

Figure 8:
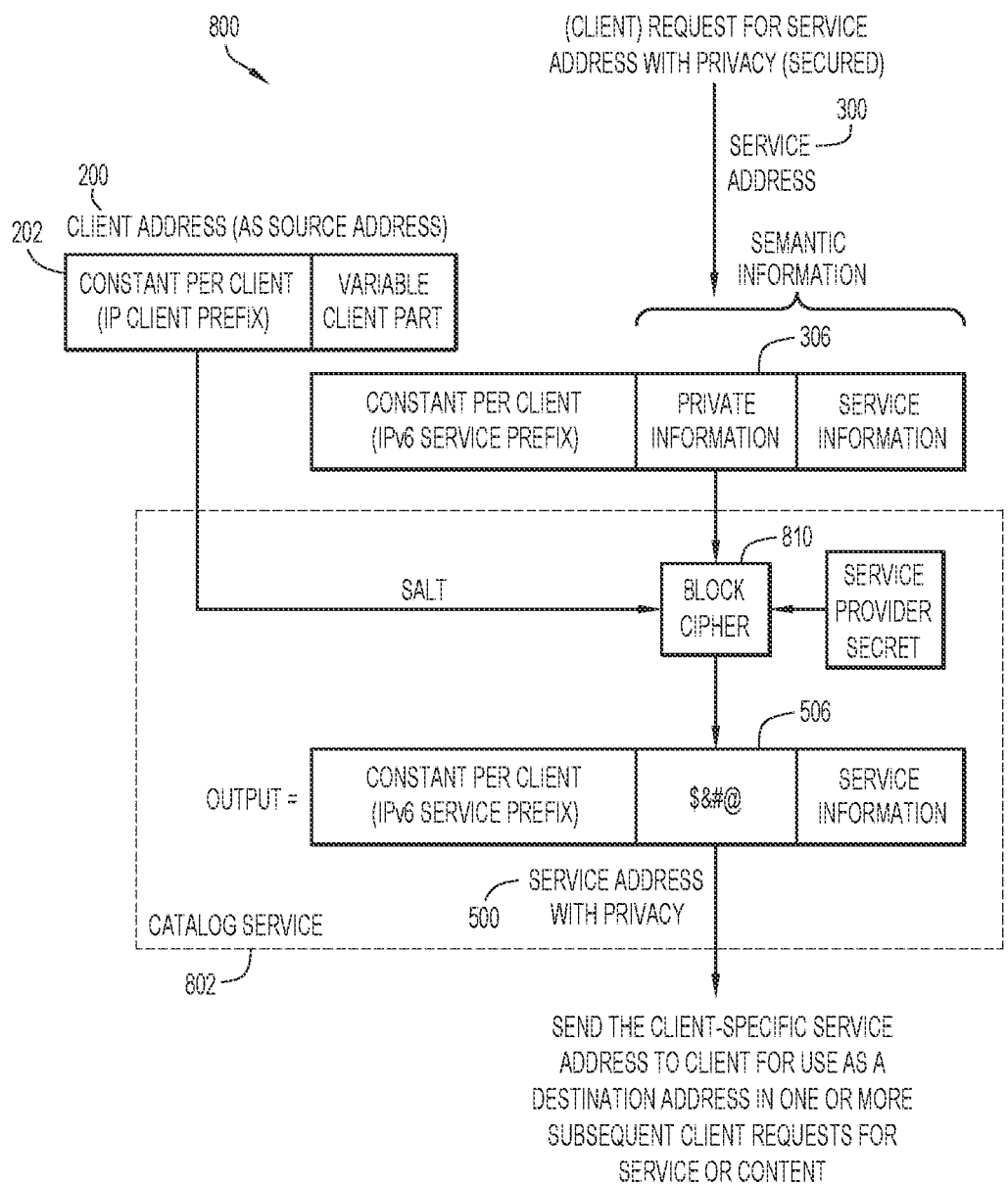
FIG. 8 is a block diagram for illustrating the generation of encrypted private information for the generation of a client-specific service address according to some implementations of the present disclosure.

FIG. 8 is a block diagram 800 for illustrating the generation of the encrypted private information for the generation of the client-specific service address as described above in relation to step 706a of FIG. 7. As indicated in FIG. 8, the generation of the encrypted private information may be performed by a catalog service node 802 which includes a block cipher 810.

Figure 9:
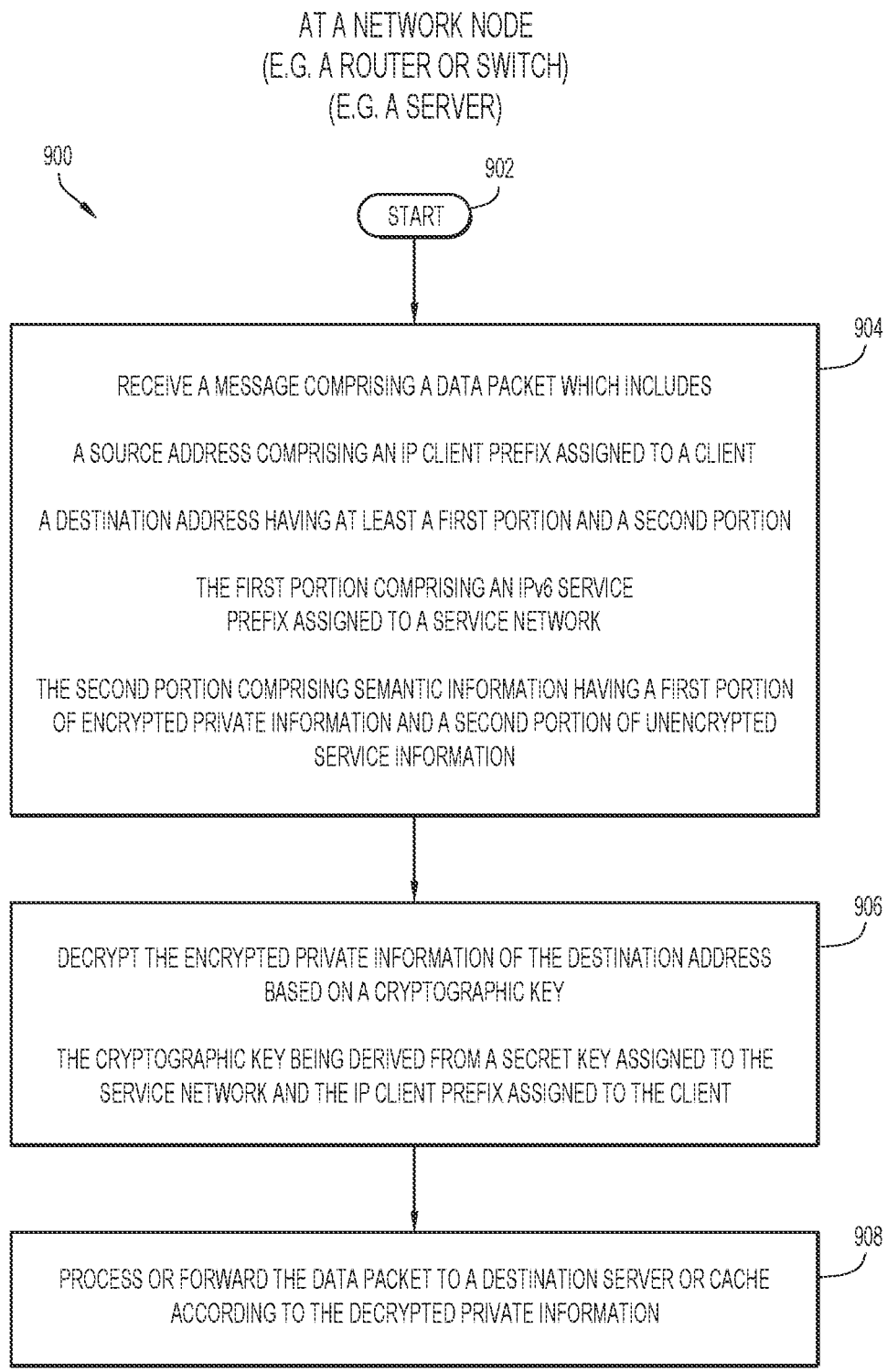
FIG. 9 is a flowchart for describing a method for use in facilitating user privacy in communications involving semantic-bearing IPv6 addresses according to some implementations of the present disclosure.

FIG. 9 is a flowchart 900 for describing a method for use in facilitating user privacy in communications involving semantic-bearing IPv6 addresses according to some implementations of the present disclosure. The method may be performed by a network node, such as a router or a switch; alternatively, the network node may be a server or service node. More generally, the network node may include one or more processors, one or more memories coupled to the one or more processors, and one or more network/communication interfaces or ports. The method may be embodied as a computer program product including a non-transitory computer readable medium and instructions stored in the computer readable medium, where the instructions are executable on one or more processors of the network node for performing the steps of the method.

Beginning at a start block 9 of FIG. 9, a message comprising a data packet may be received at a network node (step 904 of FIG. 9). In some implementations, the message may originate from a client and indicate a request for service or content. The message may include a source address and a destination address. The source address may include an IP client prefix assigned to a client (e.g. an IPv6 DHCP-PD prefix). The destination address may have at least a first portion and a second portion. The first portion of the destination address may comprise an IPv6 service prefix assigned to a service network of a service provider. The second portion of the destination address may comprise semantic information having a first portion of encrypted private information and a second portion of unencrypted service information.

The encrypted private information of the destination address may be decrypted based on a cryptographic key (step 906 of FIG. 9). The cryptographic key may be derived based on a secret key associated with the service provider and the IP client assigned to the client. In some implementations, the cryptographic key may be derived or generated by concatenating the secret key associated with the service provider and the IP client prefix assigned to the client. Thus, the cryptographic key may be a concatenation of the secret key associated with the service provider and the IP client prefix assigned to the client. The secret key associated with the service provider may be obtained based on a (e.g. local) access to stored associations between identifiers of service providers and their secret keys. The IP client prefix may be obtained from the source address of the initial message indicating the request.

The data packet may be processed or forwarded to a destination server or cache based at least in part on the decrypted private information (step 908 of FIG. 9). Where the network node is a router or switch, for example, the network node may forward the data packet to or toward the destination server or cache based at least in part on private information. Further, where the unencrypted service information is bandwidth or QoS criteria, the network node may process and/or forward the data packet in satisfaction of the bandwidth or QoS criteria. Where the network node is a (destination) server, for example, the network node may process the data packet at least in part on the decrypted private information. Here, server or network-side responses to the client may also use the client-specific service address as a source address, so that the interaction remains transparent to parties outside of the service provider domain.

In some implementations, the secret key associated with the service provider may be provided at the network node based on a previous provisioning of the secret key at such "authorized" network node. Unauthorized network nodes (i.e. not being pre-provisioned with the secret key) are not capable of decrypting the private information, but may nonetheless still process or forward the data packet based on (e.g. in satisfaction of) the unencrypted service information (e.g. bandwidth and/or QoS criteria) in the semantic information. Also in some implementations, the action to perform decryption of the encrypted private information in step 906 may be performed (only) in response to identifying predetermined information in the first portion of the service (destination) address (e.g. the IPv6 service prefix) and/or the unencrypted service information of the semantic information.

Figure 10:
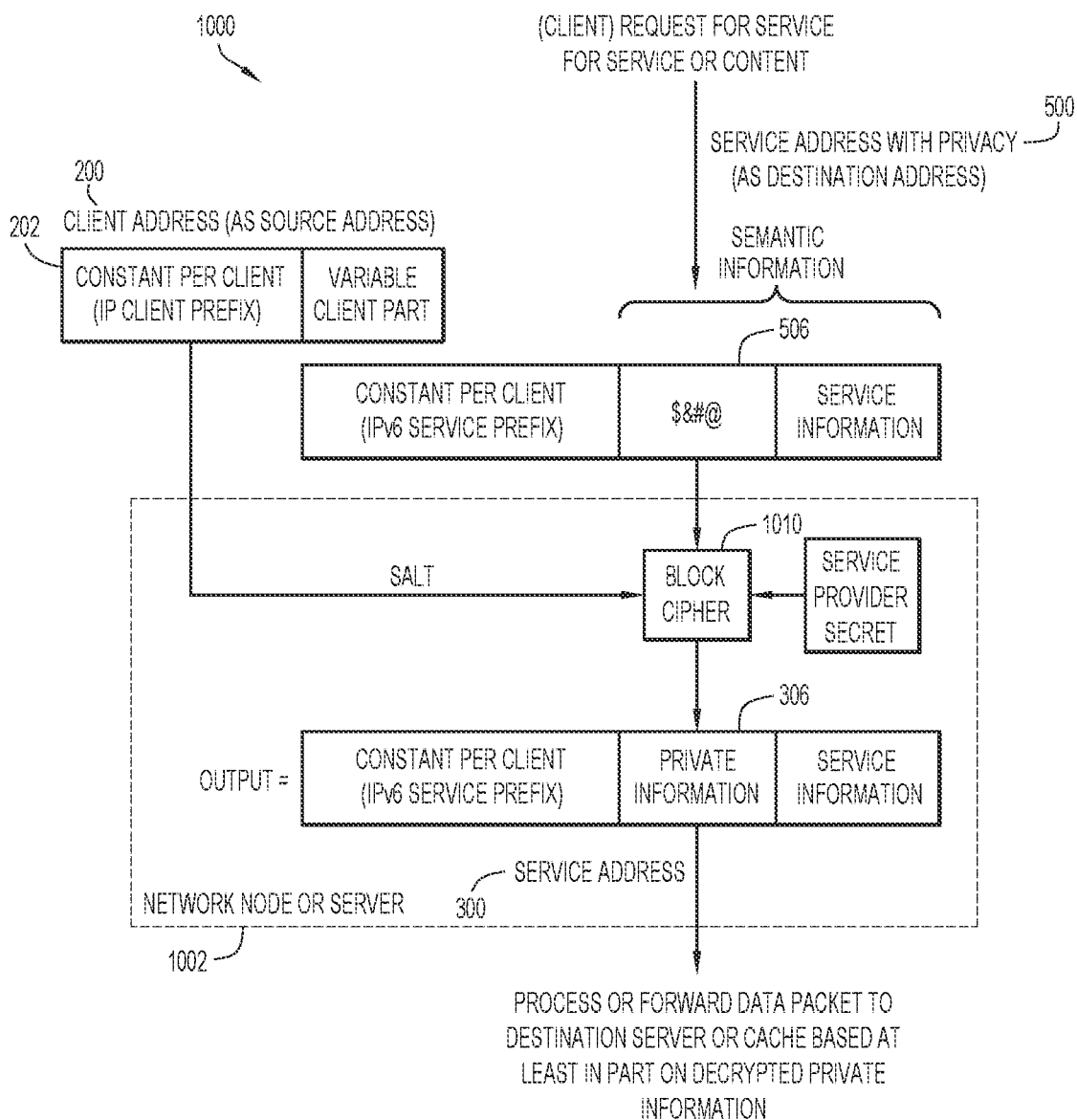
FIG. 10 is a block diagram for illustrating the generation of decrypted private information for the generation of a service address according to some implementations of the present disclosure.

FIG. 10 is a block diagram 1000 for illustrating the generation of the decrypted private information for the generation of the service address as described above in relation to step 906 of FIG. 9. As indicated in FIG. 10, the generation of the decrypted private information may be performed by a network node 1002 which includes a block cipher 1010.

Moving ahead, the present techniques may be specifically used to facilitate the delivery of media content in some implementations of the present disclosure. Media content (both audio and video) may be divided into chunks or segments for both storage in and delivery over a network. In that way, for example, media content that can be of many hours' duration (such as a film or broadcast of a sporting event) can be divided into a number of segments of shorter playback time (such as between 30 seconds and 5 minutes).

When a client requests particular media content, such as a particular video file, it may obtain each of the chunks of data that make up that media content. One way of streaming media content using chunking is to use a technique such as Dynamic Adaptive Streaming over HTTP (DASH), which allows adaptive bit rate streaming of media content, stored as chunks in a network one or more HTTP servers, to a network destination requesting the data.

Prior to storage, the media content is divided into shorter chunks or segments and alternative versions of each chunk are stored at various servers in the network. The alternative versions may be, for example, encoded at different bit rates or may have different formats for playback through a variety of different clients or end user devices (Internet-connected TVs, set top boxes, mobile devices including smartphones, laptops etc.)

When the content chunks are created, a DASH manifest file is also created, which identifies the chunks of data necessary to recreate the whole stream of media content, including details of alternative chunks (for example those that are encoded at different bit rates). Separate DASH manifest files may be created for different formats or encodings of a particular stream of media content, such that a set top box would be working from a different DASH manifest to that used by a smartphone.

The DASH manifest typically also includes an indication of the location of each of the chunks. However, when dealing with consecutive or aggregate chunks, a manifest template can be used to group multiple chunks that follow a regular format into one description. This can enable easier parsing of the manifest file.

Based on the manifest, the client may retrieve and reconstruct the full media content at the highest bit rate currently available to it over the network. In particular, the client can obtain subsequent chunks identified in the manifest while decoding and displaying a current chunk.

Domain name service (DNS) and content networking are now discussed in brief. DNS is a highly-scalable, globally-distributed database for resolving a Fully Qualified Domain Name (FQDN) to a record containing information associated with the FQDN. The most common usage of the DNS is for obtaining A and AAAA records, which contain a single IPv4 or IPv6 address, respectively. An IPv4 address may be used to IP route towards a particular host associated with that FQDN. The host referred to by the IP address, particularly in the case of video or other types of content delivery, is commonly a VIP (Virtual IP) address which, through a series of redirections (at the DNS level as well as layers above), ultimately reaches a server containing a process to serve the content requested as well as the content itself (though the content may in turn be on a file system that is further abstracted away).

This system has built up over time, and contains a number of redirections, lookup tables, protocol formats, specialized equipment, etc. Some of these processes were designed due to the specific restrictions at the time. For example, IPv4 addresses are a constrained resource and parts of the DNS of decades past commonly operated under very high load given its serving capability at the time.

On the other hand, IPv6 Content Networking (6CN) operates by assigning a globally-unique IPv6 address to content itself, and in the case of video to ABR chunks of data. It can be assumed that the addressing follows a model that allows for IP Classless Inter-Domain Routing (CIDR) longest match aggregate prefixes corresponding chunks of data that would normally be accessed or stored in sequential (or at least predictable) address blocks. Further, the addressing may refer to an actual piece of content, or content with a particular function applied (such as Just-In-Time Transcoding or "JITT" of video, decompression, encryption, etc.).

6CN may assume that a "packager" is preprocessing the content, possibly into ABR chunks, and in doing can assign a unique identifier. When that unique identifier is an IPv6 address, it fits the underlying IP routing systems such that it can be directly routed directly to it rather than subject multiple layers to full processing of the URI.

As an example, a request to access a single chunk of data with http may look like this:
http://[2001:DB8:1234:5678:9ABC:DEF0:1234:5678]
Alternatively, if DNS is used, it may look like this:
http://gameofthrones-503e04-1024-xxxx.hbo
where xxxx points to a specific chunk within the 1024 encoding of episode 4, season 3, of a popular series on HBO. Adding ".comcast" could be Comcast's encoding of that same piece of content prefaced by Comcast's 6CN IPv6 prefix.

Figure 11A:
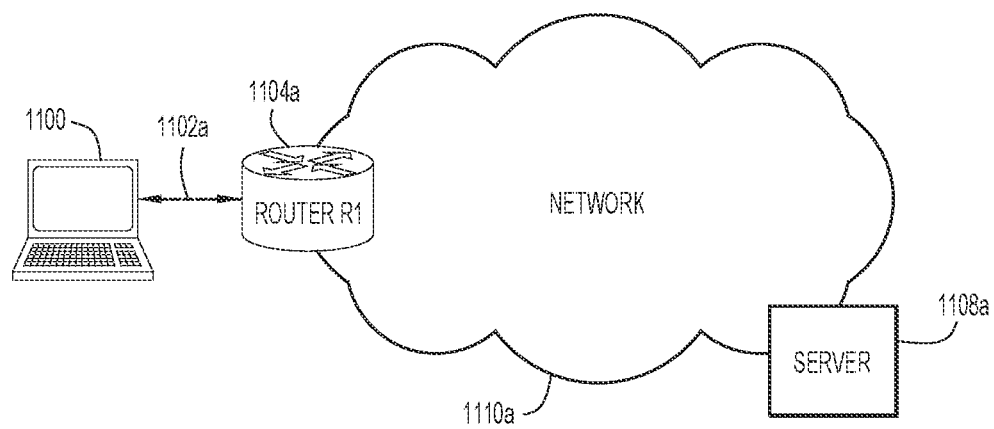
FIGS. 11A and 11B are illustrative representations of communication networks for communications involving media content delivery using semantic-bearing IPv6 addresses having user privacy.
Figure 11B:
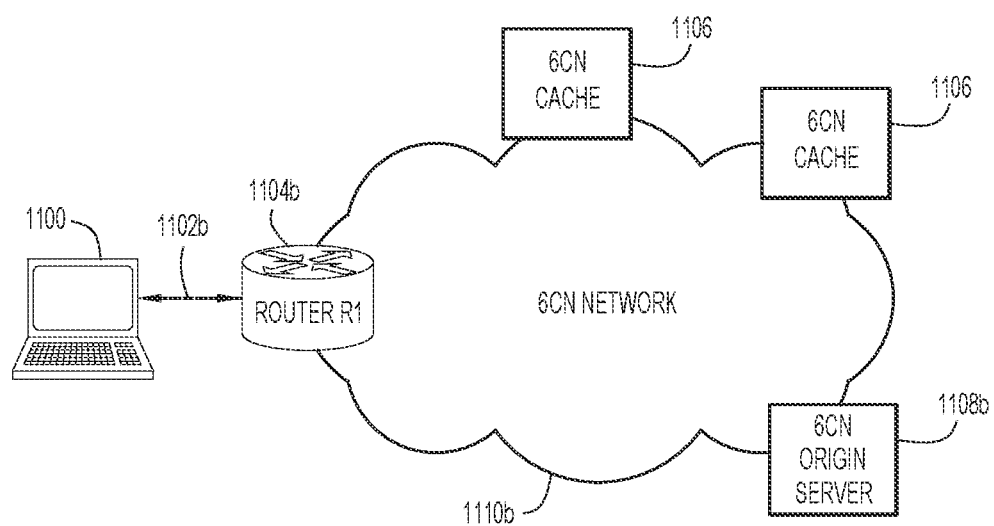

Again, the present techniques as described above in relation to the previous figures may be specifically applied to facilitate the delivery of media content. To that end, in FIG. 11A, what is shown is a network 1110a having a client 1100 and a server 1108a of a service provider, where the client 1100 may send a message 1102a which indicates a request for content. The message 1102a may traverse one or more network nodes (e.g. a router 1104a) to reach (a destination) server 1108a and/or its associated caches. In FIG. 11B, what is shown is a network 1110b having client 1100 and a 6CN origin server 1108b of a service provider, where the client 1100 may send a message 1102b which indicates a request for content. The message 1102b may traverse one or more network nodes (e.g. router 1104a) to reach the 6CN origin server 1108b or 6CN caches 1106.

Figure 12:
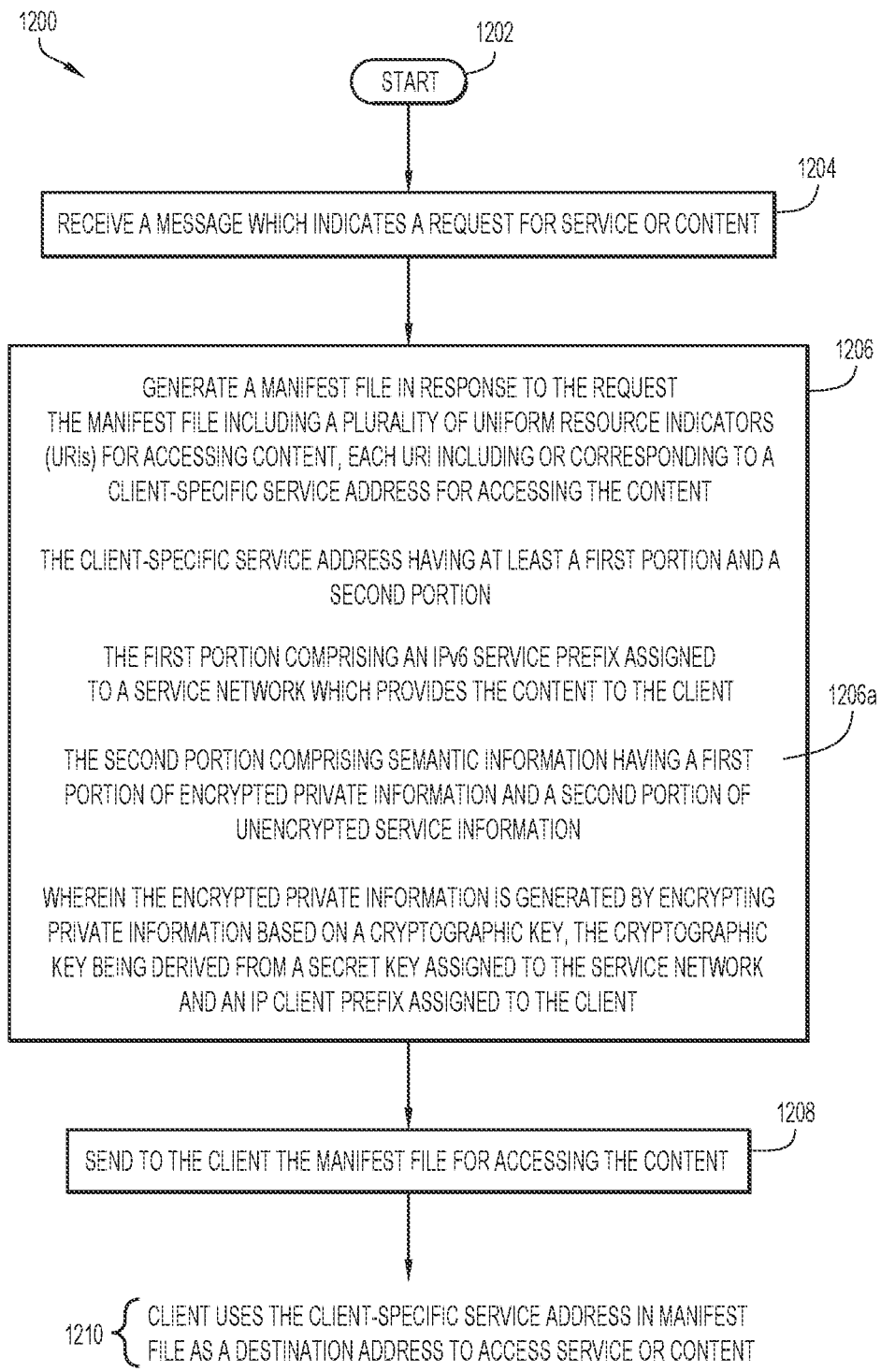
FIG. 12 is a flowchart for describing a method for use in facilitating user privacy in media content delivery involving semantic-bearing IPv6 addresses according to some implementations of the present disclosure.

FIG. 12 is a flowchart 1200 for describing a method for use in facilitating user privacy in media content delivery involving semantic-bearing IPv6 addresses according to some implementations of the present disclosure. The method may be performed by a network node, such as a router or a switch; alternatively, the network node may be a server or service node. More generally, the network node may include one or more processors, one or more memories coupled to the one or more processors, and one or more network/communication interfaces or ports. The method may be embodied as a computer program product including a non-transitory computer readable medium and instructions stored in the computer readable medium, where the instructions are executable on one or more processors of the network node for performing the steps of the method.

Beginning at a start block 1202 of FIG. 12, a message which indicates a request for service or content may be received (step 1204 of FIG. 12). The message may originate from a client and indicate a request for content. In response to receiving the request, a manifest file may be generated and sent to the client (steps 1206 and 1208 of FIG. 12).

The manifest file may include a list of uniform resource indicators (URIs) for the client to access content. Each URI of one or more URIs of the manifest file may include or correspond to a client-specific service address for accessing content. Notably, each client-specific service address may be a service address "with privacy" as described in relation to previous figures such as FIGS. 5-8). See e.g. FIG. 13 which illustrates a manifest file 1300 having a list of URIs, each of which include or correspond to a (e.g. unique) client-specific service address 1304.

Such a client-specific service address may have at least a first portion and a second portion. The first portion of the client-specific service address may comprise an IPv6 service prefix assigned to a service network for providing the content. The second portion of the client-specific service address may comprise semantic information having a first portion of encrypted private information and a second portion of unencrypted service information.

The encrypted private information may be generated by obtaining private information and encrypting the private information based on a cryptographic key (step 1206a of FIG. 12). The cryptographic key may be derived based on a secret key associated with the service provider and an IP client prefix assigned to the client. In some implementations, the cryptographic key may be derived or generated by concatenating the secret key associated with the service provider and the IP client prefix assigned to the client. The secret key associated with the service provider may be obtained based on accessing (e.g. a database having) stored associations between identifiers of service providers and their (shared) secret keys. The IP client prefix may be obtained from the source address of the initial message indicating the request.

Upon receipt by the client, the client-specific service address may be for use as a destination address in one or more subsequent client requests for content (indication 1210 of FIG. 12).

Figure 14:
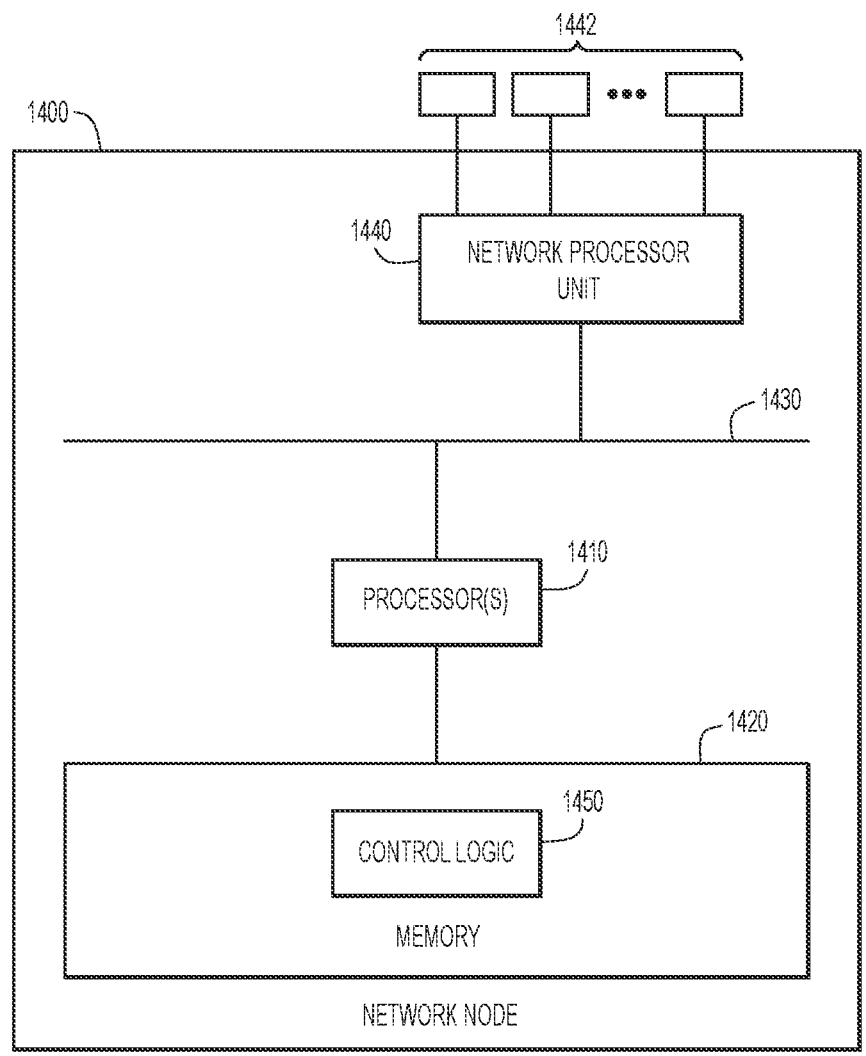
FIG. 14 illustrates a block diagram of a network node (e.g. a router or switch) configured to perform operations according to some implementations as described herein.

FIG. 14 illustrates a block diagram of a network node (e.g. a router or switch) configured to perform operations described above according to some implementations. The network node 1400 includes one or more processors 1410 for control, memory 1420, a bus 1430 and a network processor unit 1440. The processor 1410 may be a microprocessor or microcontroller. The network processor unit 1440 may include one or more Application Specific Integrated Circuits (ASICs), linecards, etc., and facilitates network communications between the node 1400 and other network nodes.

There are a plurality of network ports 1442 at which the node 1400 receives packets and from which the node 1400 sends packets into the network. The processor 1410 executes instructions associated with software stored in memory 1420. Specifically, the memory 1420 stores instructions for control logic 1450 that, when executed by the processor 1410, causes the processor 1410 to perform various operations on behalf of the node 1400 as described herein. The memory 1420 also stores configuration information 1460 received from a network controller to configure the network node according to desired network functions. It should be noted that in some embodiments, the control logic 1450 may be implemented in the form of firmware implemented by one or more ASICs as part of the network processor unit 1440.

The memory 1420 may include read only memory (ROM) of any type now known or hereinafter developed, random access memory (RAM) of any type now known or hereinafter developed, magnetic disk storage media devices, tamper-proof storage, optical storage media devices, flash memory devices, electrical, optical, or other physical/tangible memory storage devices. In general, the memory 1420 may comprise one or more tangible (non-transitory) computer readable storage media (e.g., a memory device) encoded with software comprising computer executable instructions and when the software is executed (by the processor 1410) it is operable to perform certain network node operations described herein.

Figure 15:
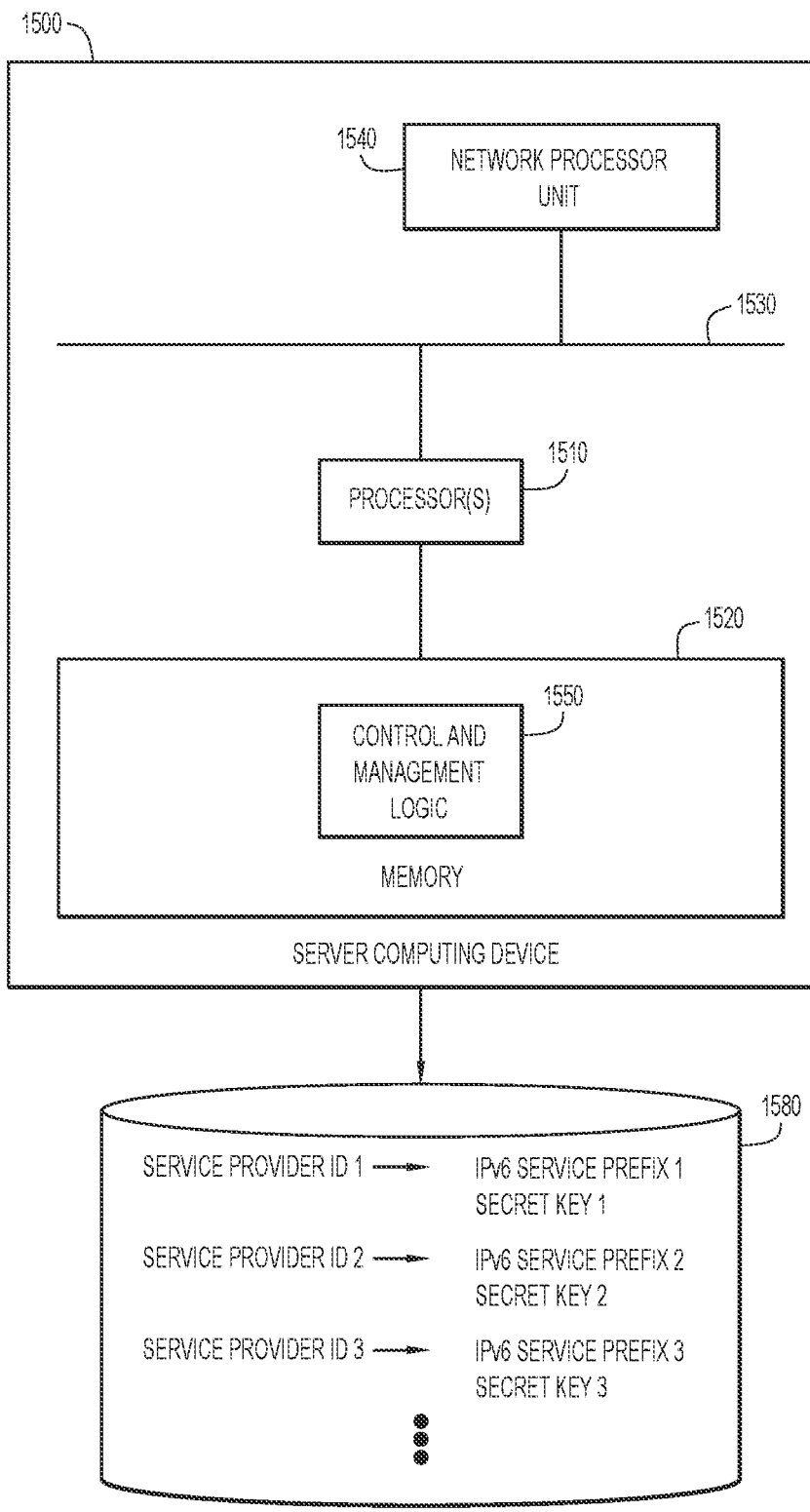
FIG. 15 illustrates a block diagram of a server computing device that may perform the functions of a service or catalog service node according to some implementations as described herein.

FIG. 15 illustrates a block diagram of a server computing device 1500 that may perform the functions of a catalog service node of a catalog service as described herein. The computing/control entity 1500 includes one or more processors 1510, memory 1520, a bus 1530, and a network interface unit 1540, such as one or more network interface cards that enable network connectivity. The memory 1520 stores instructions for control and management logic 1550, that when executed by the processor 1510, cause the processor to perform the operations described herein.

The memory 1510 may include ROM of any type now known or hereinafter developed, RAM of any type now known or hereinafter developed, magnetic disk storage media devices, tamper-proof storage, optical storage media devices, flash memory devices, electrical, optical, or other physical/tangible memory storage devices. In general, the memory 1520 may comprise one or more tangible (non-transitory) computer readable storage media (e.g., a memory device) encoded with software comprising computer executable instructions and when the software is executed (by the processor 1510) it is operable to perform the operations described herein.

The server computing device 1500 has access to a database 1580 which stores (at least) a plurality of secret keys in association with a plurality of different service providers. Each service provider may be associated with a unique secret key, as well as with a service network having a unique IPv6 service prefix. In the illustrated example, a unique IPv6 service prefix and a unique secret key of a service provider are stored in database 1580 in association with a service provider ID or name for retrieval.

In some implementations, the IPv6 service prefix and the secret key of a service provider may be retrieved based on the service ID or name of the service provider. In other implementations, the IPv6 service prefix is known, and the secret key of the service provider may be retrieved based on the IPv6 service prefix. Server computing device 1500 may be configured to generate encrypted private information for a client-specific service address, by obtaining private information and the IP client prefix of the client, as well as the IPv6 service prefix and secret key of the service provider (e.g. from the database 1580), and performing the processes as described earlier above (e.g. in relation to the methods of the catalog service node of FIGS. 6, 7, and 8).

Note that, although in some implementations of the present disclosure, one or more (or all) of the components, functions, and/or techniques described in relation to the figures may be employed together for operation in a cooperative manner, each one of the components, functions, and/or techniques may indeed be employed separately and individually, to facilitate or provide one or more advantages of the present disclosure.

While various aspects of implementations within the scope of the appended claims are described above, it should be apparent that the various features of implementations described above may be embodied in a wide variety of forms and that any specific structure and/or function described above is merely illustrative. Based on the present disclosure one skilled in the art should appreciate that an aspect described herein may be implemented independently of any other aspects and that two or more of these aspects may be combined in various ways. For example, an apparatus may be implemented and/or a method may be practiced using any number of the aspects set forth herein. In addition, such an apparatus may be implemented and/or such a method may be practiced using other structure and/or functionality in addition to or other than one or more of the aspects set forth herein.

It will also be understood that, although the terms "first," "second," etc. may be used herein to describe various elements, these elements should not be limited by these terms. These terms are used to distinguish one element from another. For example, a first portion could be termed a second portion, and similarly, a second portion could be termed a first portion, without changing the meaning of the description, so long as all occurrences of the "first portion" are renamed consistently and all occurrences of the "second portion" are renamed consistently. The first portion and the second portion are both portions, but they are not the same portion.

The terminology used herein is for the purpose of describing particular embodiments only and is not intended to be limiting of the claims. As used in the description of the embodiments and the appended claims, the singular forms "a", "an" and "the" are intended to include the plural forms as well, unless the context clearly indicates otherwise. It will also be understood that the term "and/or" as used herein refers to and encompasses any and all possible combinations of one or more of the associated listed items. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

As used herein, the term "if" may be construed to mean "when" or "upon" or "in response to determining" or "in accordance with a determination" or "in response to detecting," that a stated condition precedent is true, depending on the context. Similarly, the phrase "if it is determined [that a stated condition precedent is true]" or "if [a stated condition precedent is true]" or "when [a stated condition precedent is true]" may be construed to mean "upon determining" or "in response to determining" or "in accordance with a determination" or "upon detecting" or "in response to detecting" that the stated condition precedent is true, depending on the context.

What is claimed is:

1. A method comprising:
   at a network node configured to be provisioned with a shared secret key of a service provider associated with a service network,
      receiving a message comprising a data packet originating from a client, the data packet including:
         a source address which includes an Internet Protocol (IP) client prefix assigned to the client;
         a destination address having at least a first portion and a second portion, the first portion including an IP version 6 (IPv6) service prefix assigned to the service network of the service provider, the second portion comprising semantic information having a first portion of encrypted private information and a second portion of unencrypted service information for application of policy for the data packet;
      decrypting the encrypted private information of the destination address based on a cryptographic key to provide decrypted private information, the cryptographic key being derived based on the shared secret key of the service provider and the IP client prefix assigned to the client; and
      processing or forwarding the data packet to a destination server or cache based at least in part on the decrypted private information.

2. The method of claim 1, which is performed by a network node comprising a router or switch configured to forward the data packet to the destination server or cache based at least in part on the decrypted private information.

3. The method of claim 1, further comprising:
   at the network node,
      deriving the cryptographic key based on the shared secret key of the service provider and the IP client prefix assigned to the client.

4. The method of claim 1, wherein the cryptographic key comprises a concatenation of the shared secret key of the service provider and the IP client prefix assigned to the client.

5. The method of claim 1, wherein the decrypted private information comprises personally identifiable information (PII) or sensitive personal information (SPI).

6. The method of claim 1, wherein the decrypted private information comprises a user identifier or a tenant identifier.

7. The method of claim 1, wherein the decrypted private information comprises a content identifier.

8. The method of claim 1, wherein the decrypted private information comprises a content identifier which identifies content to be accessed by the client, and wherein the processing or forwarding comprises forwarding the data packet to a destination cache which includes the content.

9. The method of claim 1, wherein the unencrypted service information for the application of policy for the data packet comprises bandwidth or Quality of Service (QoS) criteria, the method further comprising:
   at the network node,
      processing or forwarding the data packet in satisfaction of the bandwidth or QoS criteria.

10. A network node comprising:
    one or more processors;
    a plurality of interfaces or ports;
    the one or more processors being configured to operate the network node to receive a provisioning of a shared secret key of a service provider associated with a service network, and further to:
       receive, via an interface or port, a message comprising a data packet originating from a client, the data packet including:
          a source address which includes an Internet Protocol (IP) client prefix assigned to the client;
          a destination address having at least a first portion and a second portion, the first portion comprising an IP version 6 (IPv6) service prefix assigned to the service network of the service provider, the second portion comprising semantic information having a first portion of encrypted private information and a second portion of unencrypted service information for application of policy for the data packet;
       decrypt the encrypted private information of the destination address based on a cryptographic key to provide decrypted private information, the cryptographic key being derived based on the shared secret key of the service provider and the IP client prefix assigned to the client; and
       process or forward the data packet to a destination server or cache based at least in part on the decrypted private information.

11. The network node of claim 10, wherein the decrypted private information comprises one of a content identifier, a user identifier, and a tenant identifier, and wherein the one or more processors are configured to operate the network node further to:
    derive the cryptographic key based on the shared secret key of the service provider and the IP client prefix assigned to the client.

12. The network node of claim 10, wherein the source address which includes IP client prefix assigned to the client further comprises an IPv6 Dynamic Host Configuration Protocol Prefix Delegation (DHCP-PD) prefix (IPv6 DHCP-PD prefix).

13. A method comprising:
    maintaining access to a database which stores a shared secret key of a service provider;
    receiving a message which indicates a request for a client-specific service address for a client for obtaining a service or content associated with the service provider;
    generating a client-specific service address in response to the request, the client-specific service address having:
       a first portion comprising an Internet Protocol version 6 (IPv6) service prefix assigned to a service network of the service provider;
       a second portion comprising semantic information having a first portion of encrypted private information and a second portion of unencrypted service information for application of policy on an application or flow for obtaining the service or content;

wherein generating the client-specific service address comprises generating the encrypted private information by encrypting private information based on a cryptographic key, the cryptographic key being derived based on the shared secret key of the service provider and an IP client prefix assigned to the client; and sending to the client one or more messages which include the client-specific service address.

14. The method of claim 13, wherein the client-specific service address is for use as a destination address in one or more subsequent client requests for the service or content.

15. The method of claim 13, wherein the one or more messages which include the client-specific service address includes a manifest file having a list of uniform resource indicators (URIs) for accessing content, wherein each one of one or more URIs of the manifest file includes or corresponds to the client-specific service address.

16. The method of claim 13, wherein the cryptographic key comprises a concatenation of the shared secret key of the service provider and the IP client prefix assigned to the client.

17. The method of claim 13, wherein the private information comprises personally identifiable information (PII) or sensitive personal information (SPI).

18. The method of claim 13, wherein the private information comprises one of a service identifier, a content identifier, a user identifier, or a tenant identifier.

19. The method of claim 13, wherein the unencrypted service information for the application of policy comprises bandwidth or Quality of Service (QoS) criteria.

20. The method of claim 13, which is performed by a catalog service node having the database for storing a plurality of shared secret keys in association with a plurality of different service provider IDs or names, wherein the shared secret key is retrieved from the database according to a service provider ID or name of the service provider.

* * * * *